United States Patent

[11] 3,596,977

| [72] | Inventor | Howard P. Bunger<br>6900 West 38th Ave., Wheatridge, Colo. 80033 |
|---|---|---|
| [21] | Appl. No. | 849,726 |
| [22] | Filed | Aug. 13, 1969 |
| [45] | Patented | Aug. 3, 1971 |

[54] FOLDABLE CAR TOP SHELTER
10 Claims, 7 Drawing Figs.

[52] U.S. Cl. ............................................. 296/27, 135/5
[51] Int. Cl. .................................................. B60p 3/34
[50] Field of Search ........................................... 296/23, 27, 23.6; 135/1 A, 5 A

[56] References Cited
UNITED STATES PATENTS

| 2,710,977 | 6/1955 | Fannin | 296/23 X |
| 2,825,351 | 3/1958 | Thornton | 135/5 A |

*Primary Examiner*—Philip Goodman
*Attorney*—Richard D. Law

ABSTRACT: A foldable car top shelter, having a top and bottom, with a pair of hinged side members on each side carrying rollup curtains pivot outwardly providing side shelter curtains, and a pullout top cover for each side, weather seals with the pivoted sides providing an end curtain for each side shelter for the vehicle. Space in the unit holds bunks, bedding or the like.

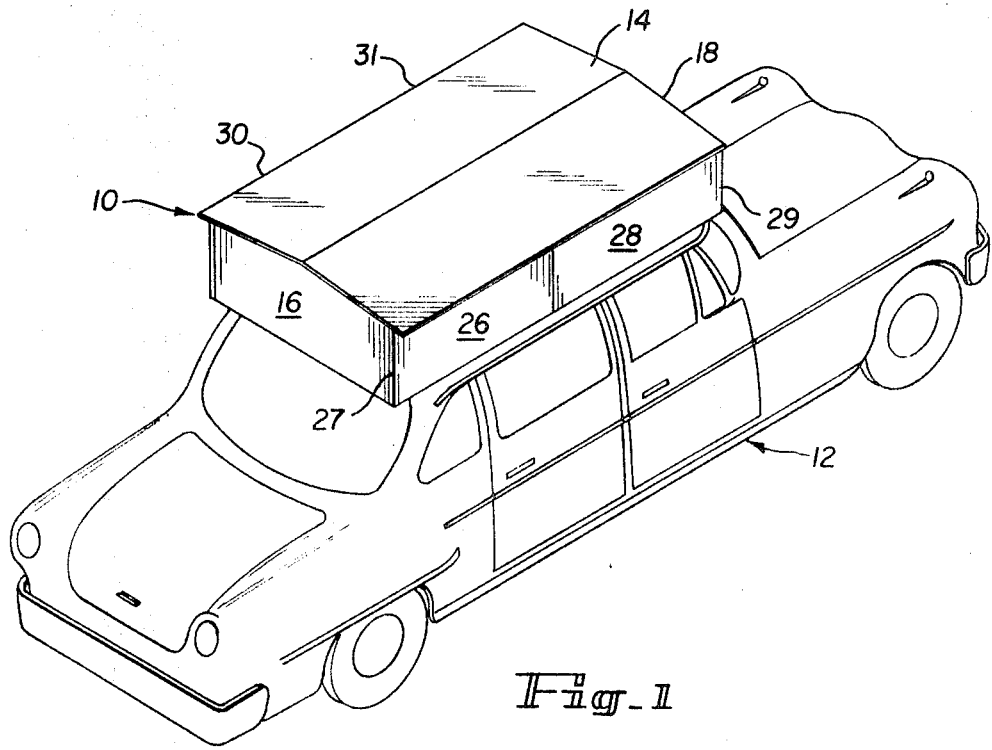
Fig_1
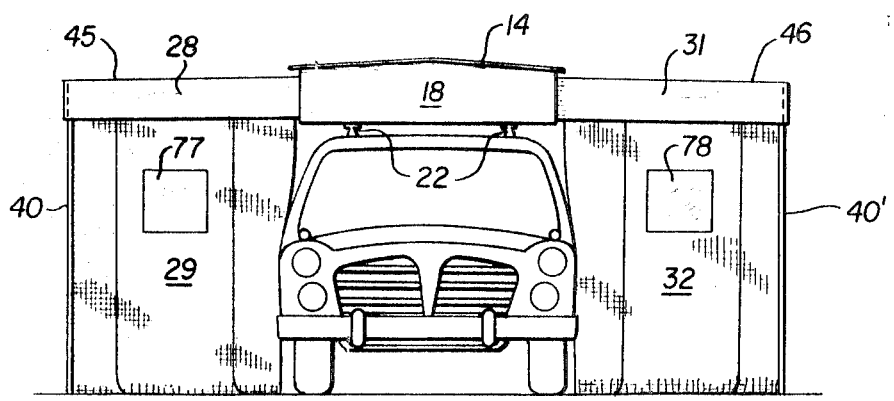
Fig_2
INVENTOR.
HOWARD P. BUNGER
BY
Richard D. Law
ATTORNEY INVENTOR.
HOWARD P. BUNGER
BY
Richard D. Law
ATTORNEY

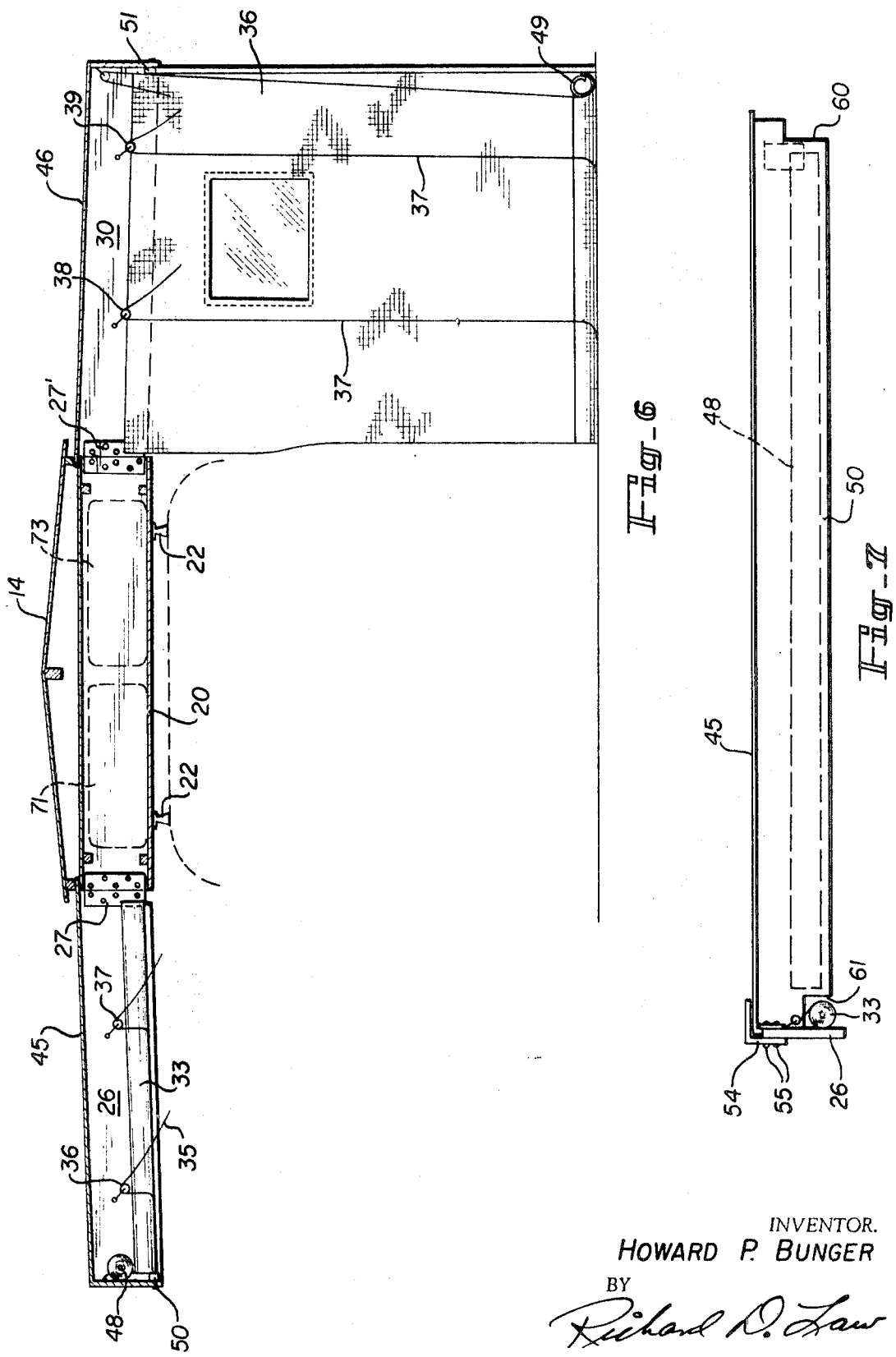

FOLDABLE CAR TOP SHELTER

As is well known, camping engrosses a larger number of people each year and during all times of the year. Campers utilize tents, tent trailers, trailers and the like. One other type of unit which is used to a minor extent is a car top shelter, in which a container mounted on top of a vehicle has various appendages that extend from the carrier to form various types of shelters either free or supported on the vehicle. Such car top units have not been entirely practical because of the complexity of the unit, its heaviness and the time necessary to set up or take down the unit.

According to the present invention, I have provided a simplified unit which is mounted in a car top container or carrier, and which provides shelters on each side of the vehicle as three-sided shelters utilizing the vehicle for the fourth side of each of the shelters. The device is simple, and most important it is quite light in relation to its total coverage of shelter area, so that it is easily handled and positioned on a vehicle by a single person. The device utilizes a series of rolldown curtains which are held on support members suspended from the carrier itself. Means are provided for sealing the top of each side shelter to the sides thereof providing a weather proof cover. Each shelter includes rolldown curtains which may be attached together to provide a weathertight shelter on each side of the vehicle.

Therefore, it is among the objects and advantages of the invention to provide a foldable, car top carrier having at least one means for suspending three rollup curtains from a side of the carrier to provide an extending three-sided flexible wall shelter on the side of the vehicle, utilizing the vehicle as the fourth wall for a complete enclosure.

Another object of the invention is to provide a car top carrier having enclosed foldable shelters which form opposed shelters on each side of the vehicle, and provides a substantial amount of storage space in the carrier.

Another object of the invention is to provide a foldable car top carrier which forms opposed enclosures on each side of the car and which utilizes rigid covers for each of said enclosures.

A further object of the invention is to provide a simplified means for storing and assembling flexible walls for a shelter mounted in a car top carrier, providing shelters on one or opposed sides of a vehicle.

These and other objects and advantages of the invention may be readily ascertained by referring to the following description and appended illustrations in which:

FIG. 1 is a perspective view of one form of the invention showing a car top carrier in closed position mounted on a vehicle;

FIG. 2 is a front elevational view of a vehicle and assembled shelters according to the invention, showing opposed shelters extending from a car top carrier mounted on the vehicle;

FIG. 6 is an end elevational view, taken along section line 6-6 of FIG. 3, illustrating the mechanism of the shelter walls of the invention; and FIG. 7 is an end elevational, detailed view of the outer end of a shelter top according to the invention.

Figure 3:
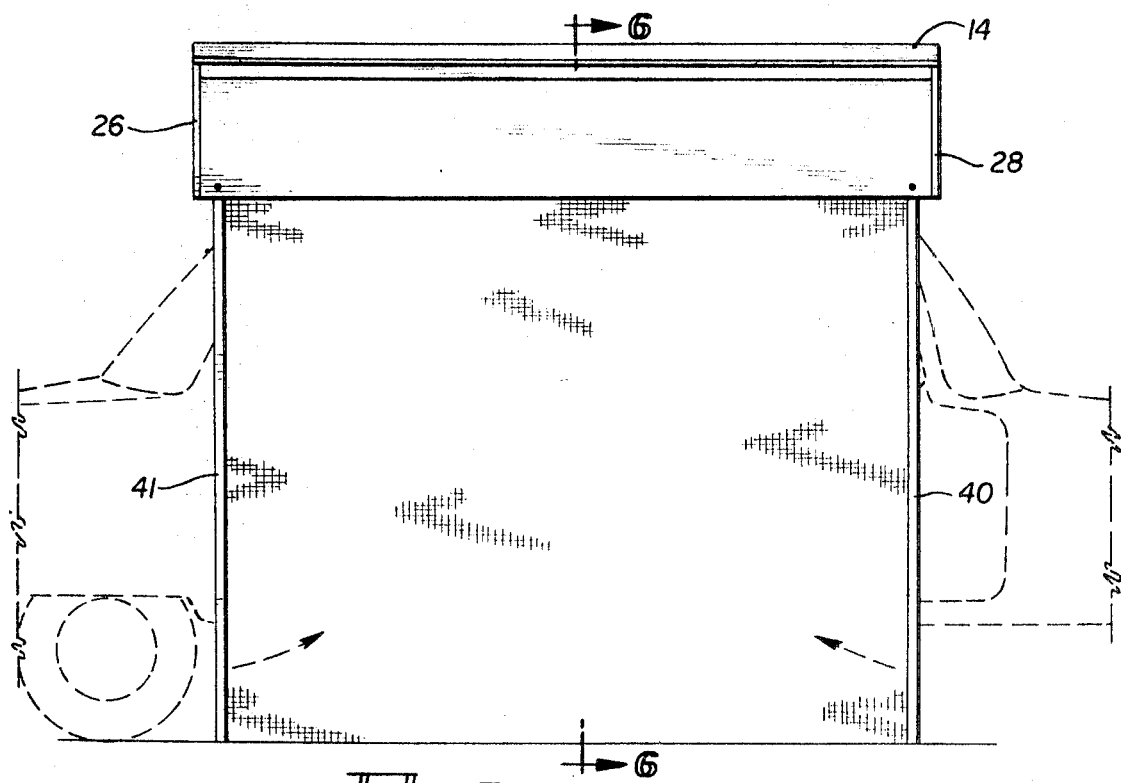
FIG. 3 is a side elevational view of one side of a shelter extending from a car top carrier according to the invention.

As shown in FIG. 1, a car top carrier according to the invention, shown in general by numeral 10, is mounted on a passenger vehicle shown in general by numeral 12. The passenger vehicle as shown is a four-door vehicle, however other types may be suitable so long as it has a sufficient roof to support the carrier. The carrier includes a flat, gabled roof 14, with ends 16 and 18 joined to a bottom 20, shown in FIG. 6. The carrier may be mounted on a car top rack, for example, lateral car top racks 22 in FIG. 2, or any suitable means for supporting it on top of the vehicle. To maintain the carrier on top of the vehicle, gutter clamps, straps and convention devices may be used, but are not shown.

The foldable shelter portions are arranged with two pivotal side doors on each side of the carrier, with each pivotal door carrying a rollup curtain which may be let down to form a side of a shelter. As shown in FIG. 1, a pivotal side or door 26, mounted on the hinge 27, at the corner of the carrier is arranged to swing outwardly, and side 28, mounted on hinge 29, is, also, arranged to pivot out about the hinge. Similar doors 30 and 31 are mounted on the opposite side. As shown in FIG. 6, the side 26 swings on its pivot 27 outwardly, and a rollup curtain 33 is mounted on the inside of the door 26. Cords 35, looped through pulleys 36 and 37, provide a means for letting down and rolling up the curtain. On the opposite side of the carrier the door 30 pivots around pivot hinge 27, and its curtain 36, shown in the down position, is, likewise, mounted on the inside of the door and the ropes 37 looped through pulleys 38 and 39 provide means for moving the curtain up and down. Where desired, uprights 40, 40' and 41, attached to corners of the shelters, e.g., to sides 28 and 26, provide support for the shelters in open position. Such supports may be particularly desireable where winds, rain and snow may be encountered.

A top is provided for each side shelter, and as shown in FIG. 6, a top 45, which telescopes internally of the carrier when closed slides out and locks with the side, providing a weatherproof seal at the top. On the opposite side top 46, which telescopes into the carrier underneath the top 45, slides out and it also locks with the side members. Each top includes a rollup curtain on the inside of the cover board of the top, for example top 45 includes rollup curtain 48 on cover board 50, and top 46 includes rollup curtain 49 on cover board 51. These curtains then may be let down, and form with the other two curtains a three-sided shelter. The cover members provide support for the outer end curtains which roll down and up, and, also, provide a seal for these curtains into the shelter.

Figure 5:
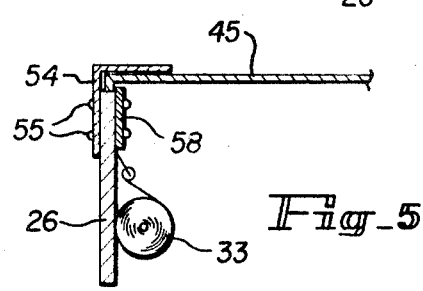
FIG. 5 is an enlarged, detail view of a seal means between a shelter top and a shelter side according to the invention.

As shown in FIGS. 5 and 7 the hinged side member 26 has an elongated angle member 54 with a flange above the side and directed inwardly. The flange is secured thereto by means of bolts or rivets 55. The top 45 includes a downwardly directed flange 57 which rides in the slot on top of the side 26 formed by the angle member 54. An inner plate 58 (secured by means of the bolt 55 to the side 26) extends slightly above the top of the side 26 leaving a slot for the top and provides means for locking the top to the side. This produces a sliding fit of the top in the groove. The arrangement of the angle and the flange on the top provides a weather seal between the top and the side, and additionally each supports the other in the assembled shelter. As shown in FIG. 7, the top 45 includes the outer member 50 which is notched at 60 at one end and 61 at the opposite end to accommodate the rollup curtain on the side members as the top is being telescoped in or withdrawn from the top carrier.

Figure 4:
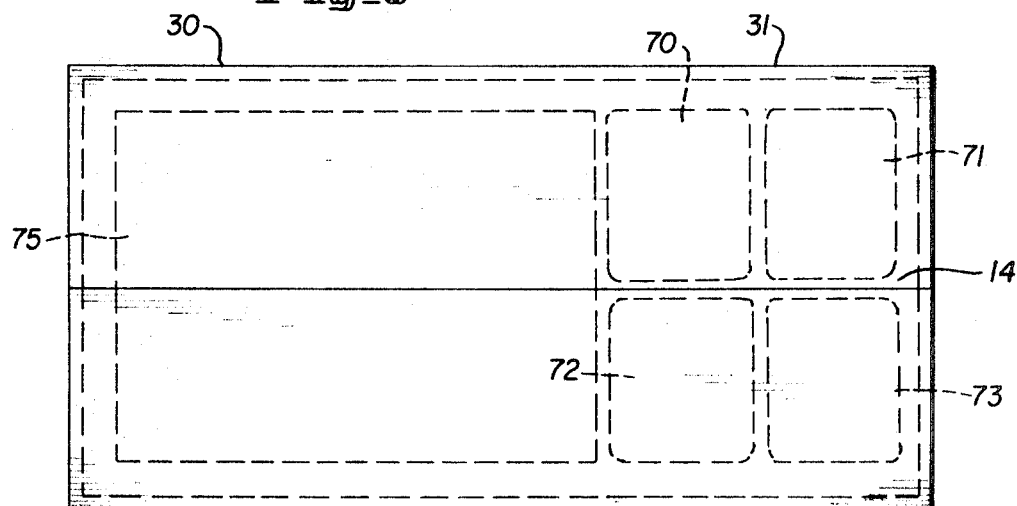
FIG. 4 is a top plan view of a car top carrier according to the invention, illustrating available storage space therein.

The carrier is deep enough to provide a substantial storage space which holds several sleeping bags, four sleeping bags 70, 71, 72 and 73 are illustrated in FIG. 4. Bunks, bunkbeds, mattresses or the like 75, may also be stored in the carrier in adjacent the bedrolls to provide beds for sleeping. Various types of other material may also be stored in the top as desired.

When first assembled on a vehicle, the carrier is preferably in closed position, as shown in FIG. 1, and after clamping the carrier in position on the vehicle, the foldable shelters are then ready for use. For use, the vehicle is placed in appropriate position and then one or both sides are then opened, as by pivoting outwardly side door 26 and side door 28 on the one side. After the sides are extended the top 45 is pulled out with its side flanges in the tracks or grooves along the sides to secure the top to the sides. The support poles may be placed in position at the corners of the shelter to support the overhead structure of the shelter in the cantilever span from the carrier. The curtains may then be lowered on one or both sides and the end curtain 48 may be lowered. By providing zippers at the corners of the curtains, the shelter may be completely enclosed with the vehicle providing the fourth wall. In a similar manner, the other side may be opened and the curtains dropped to form the enclosure.

The illustrations shown the curtains rolled by means of ropes, however the curtains may be placed on rollers and a removable crank at one end used to roll up or let down the curtain. Also, spring loaded rollers may be used for retrieving the curtain after it has been pulled down, in a manner similar to a window shade. The curtains may be provided with windows, as shown in FIG. 2 at 77 and 78 for light and, where desired, ventilation. One or more of the sides may be left in rolled up position to obtain full benefit of ventilation, where desired. Under some conditions it may be desirable to only pull down one curtain for shade leaving the other two sides up for circulation of air. When made of aluminum or magnesium the unit is very light and is easily handled by a single user.

While the invention has been illustrated by reference to a particular embodiment obvious substitutions are intended to be included within the scope of the invention.

I claim:

1. A foldable car top shelter comprising generally rectangular carrier means for mounting on the top of a vehicle including front and rear ends, a top and a bottom; a pair of side members hingedly mounted at the front and rear corners of each side of said carrier means and each side member being arranged to pivot outwardly at about right angles to the carrier means; a flexible curtain-type wall member secured to each said side member and arranged to be gathered up for storage and let down into wall position when said side member is extended; top means mounted on each side for lateral reciprocable movement into and out of said carrier means and each including an end flexible curtain-type wall member secured in position to form a letdown end wall when said top means is extended; and means for securing said top means to its adjacent pair of side members in extended position.

2. A foldable car top shelter according to claim 1 wherein said side members extend about one-half of each said side.

3. A foldable car top shelter according to claim 1 wherein said curtains are rolled up for storage and rolled down for use as a wall.

4. A foldable car top shelter according to claim 1 wherein each side members include a top, side-opening groove, and each said top includes side edges mating with each adjacent said groove, for securing each said top along its edges to said adjacent side members in extended position.

5. A foldable car top shelter according to claim 1 wherein said top means includes a front panel extending downwardly from the outer edge thereof, providing a support for said top secured wall member.

6. A foldable car top shelter according to claim 1 wherein said wall members are substantially less than the total volume of said carrier means providing storage space therein.

7. A foldable car top shelter according to claim 1 wherein said sidewall members are arranged to fasten to the adjacent said end wall member forming three sides of a shelter.

8. A foldable car top shelter according to claim 2 wherein said side members collectively form side covers for said carrier.

9. A foldable car top shelter according to claim 4 wherein said edges of each said top move into engagement with said side-opening grooves of said side members after being extended outwardly a short distance from said carrier.

10. A foldable car top shelter according to claim 4 wherein each side includes a cover over said groove and each top edge includes a downwardly directed flange, substantially forming a seal at the connection between said top means and each adjacent side member, providing an effective weather seal.